US011482015B2

(12) United States Patent
Shih et al.

(10) Patent No.: US 11,482,015 B2
(45) Date of Patent: Oct. 25, 2022

(54) METHOD FOR RECOGNIZING PARKING SPACE FOR VEHICLE AND PARKING ASSISTANCE SYSTEM USING THE METHOD

(71) Applicant: oToBrite Electronics Inc., Hsinchu (TW)

(72) Inventors: Pi-Hau Shih, Taipei (TW); Wei Jing Wong, Hsinchu (TW); Chen-Wei Hung, Hsinchu (TW)

(73) Assignee: oToBrite Electronics Inc., Hsinchu (TW)

( * ) Notice: Subject to any disclaimer, the term of this patent is extended or adjusted under 35 U.S.C. 154(b) by 438 days.

(21) Appl. No.: 16/536,439

(22) Filed: Aug. 9, 2019

(65) Prior Publication Data
US 2021/0042540 A1 Feb. 11, 2021

(51) Int. Cl.
G06V 20/58 (2022.01)
B60W 30/06 (2006.01)
G08G 1/16 (2006.01)
B62D 15/02 (2006.01)
G08G 1/14 (2006.01)

(52) U.S. Cl.
CPC ........... G06V 20/586 (2022.01); B60W 30/06 (2013.01); B62D 15/027 (2013.01); G06V 20/58 (2022.01); G08G 1/143 (2013.01); G08G 1/168 (2013.01); B60W 2420/42 (2013.01)

(58) Field of Classification Search
CPC .......... G06K 9/00812; G06K 9/00805; B60W 30/06; B60W 2420/42; B62D 15/027; G08G 1/143; G08G 1/168
See application file for complete search history.

(56) References Cited

U.S. PATENT DOCUMENTS

| 6,493,458 B2* | 12/2002 | Yasui ........................ G06T 7/74 382/104 |
| 10,628,688 B1* | 4/2020 | Kim ...................... G06N 3/0454 |
| 2016/0280268 A1* | 9/2016 | Hassani ............. B62D 15/0285 |
| 2017/0010618 A1* | 1/2017 | Shashua ................ B60W 30/18 |
| 2017/0369057 A1* | 12/2017 | Gurghian ............... G08G 1/167 |
| 2018/0025640 A1* | 1/2018 | Micks ................ G06K 9/00812 340/932.2 |
| 2019/0271550 A1* | 9/2019 | Breed .............. G08G 1/096725 |
| 2019/0286153 A1* | 9/2019 | Rankawat ................. G06T 7/11 |

(Continued)

Primary Examiner — Santiago Garcia
(74) Attorney, Agent, or Firm — Demian K. Jackson; Jackson IPG PLLC

(57) ABSTRACT

A method for recognizing a parking space for a vehicle and a parking assistance system are disclosed. An obstacle is identified from successive image frames captured when the vehicle is moving and a first boundary for the obstacle is generated by a Convolutional Neural Network (CNN) algorithm based on a position of the obstacle shown in each of the successive image frames. Distances between the moving vehicle and the obstacle are detected by ultrasonic sensors. A second boundary for the obstacle is generated by a distance modification module based on the distances between the vehicle and the obstacle. A periphery of the obstacle is defined by a periphery definition module. In view of the periphery of the obstacle, a parking space is thus recognized by a parking space recognition module. The parking process can be changed to a self-drive mode, and remotely controlled by a mobile device.

16 Claims, 16 Drawing Sheets

(56) References Cited

U.S. PATENT DOCUMENTS

| | | | | |
|---|---|---|---|---|
| 2019/0299978 | A1* | 10/2019 | Balakrishnan | G05D 1/0221 |
| 2020/0134332 | A1* | 4/2020 | Vossoughi | G08G 1/015 |
| 2020/0193827 | A1* | 6/2020 | Refsdal | G08G 1/142 |
| 2020/0241545 | A1* | 7/2020 | Anthony | B60W 30/09 |
| 2020/0384987 | A1* | 12/2020 | Preissler | B60W 50/14 |
| 2020/0385014 | A1* | 12/2020 | Hanniel | B60W 60/001 |
| 2021/0027075 | A1* | 1/2021 | Lee | G05D 1/0231 |
| 2021/0255304 | A1* | 8/2021 | Fontijne | G06K 9/00805 |
| 2022/0126864 | A1* | 4/2022 | Moustafa | B60W 60/001 |

* cited by examiner

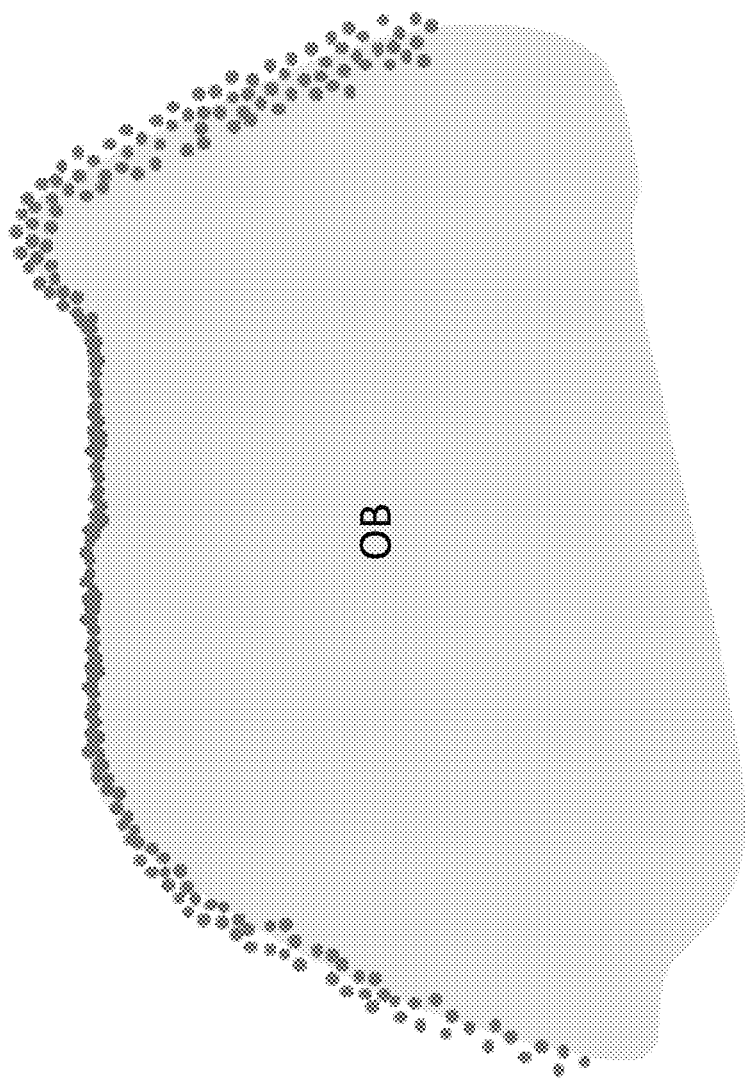

METHOD FOR RECOGNIZING PARKING SPACE FOR VEHICLE AND PARKING ASSISTANCE SYSTEM USING THE METHOD

FIELD OF THE INVENTION

The present invention relates to a method for recognizing a parking space for a vehicle and a parking assistance system using the method. More particularly, the present invention relates to a method for recognizing a parking space for a vehicle by fusing image signals and ultrasonic signals and a parking assistance system using the method.

BACKGROUND OF THE INVENTION

Thanks to the development of the automotive industry, the number of automobiles has been significantly increased and the automotive technologies have been aggressively developed. Particularly, because of the development of electronic technologies, many studies have been made with respect to intelligent automotive technologies. Among them, driver assistance systems (DASs) have been remarkably improved and applied to intelligent automobiles in recent years.

Among the driver assistance systems, parking assistance systems have been also actively researched in the intelligent automotive field, and have been practically applied to automobiles. Such parking assistance systems are used for aiding a driver to park an automobile.

Such a parking assistance system may be divided into a parking space recognition module, a parking track generation module, and a steering control module. In addition, the parking space recognition module may be divided into a parallel parking space recognition module and a perpendicular parking space recognition module. Parking space recognition may be performed, using ultrasonic waves, a rearview camera, or a laser scanner.

Among the conventional parking space recognition methods, a parking space recognition method using ultrasonic waves has a problem in that a parking space cannot be precisely recognized since an edge of a counterpart vehicle adjacent to a parking space desired for parking a vehicle cannot be precisely extracted due to the limitation in terms of distance and resolution of ultrasonic waves. A conventional parking space recognition method using a camera has a problem in that a parking space cannot be precisely recognized since the position of a counterpart vehicle cannot be precisely recognized by determining the distance to the counterpart vehicle.

That is, the conventional parking space recognition methods using either an ultrasonic sensor or a camera for recognizing a parking space have a problem in that they cannot precisely recognize a parking space due to the disadvantages of the ultrasonic sensor and the camera, respectively.

As shown in FIG. 14, U.S. Pat. No. 7,272,477, "Vehicle Parking Assisting System and Method", discloses a vehicle parking assisting system in which both of a sonic sensor and a camera are used to show a present detection point DP1 and a past detection point DP2 of an obstacle OB in an overlapping manner to assist vehicle parking. However, according to the '477 Patent, the detection points of the obstacle are affected by a lot of noises, thereby making recognition of a parking space inaccurate.

Referring to FIG. 15, U.S. Pat. No. 8,401,235, "Method and System for Recognizing Parking Lot", also discloses a parking space recognition technology using a camera and an ultrasonic sensor in such a manner that the disadvantages of the ultrasonic sensor and the camera can be compensated with each other. According to the '235 Patent, Sobel Edge Detection Algorithm is used, which is relatively inaccurate approximation though the computation is simple. The accuracy suffers significantly if no denoising process is carried out.

SUMMARY OF THE INVENTION

Accordingly, the present invention has been made to solve the above-mentioned problems occurring in the prior arts, and an object of the present invention is to provide a technology for recognizing a parking space for a vehicle by fusing image signals and ultrasonic signals.

According to an aspect of the present invention, there is provided a method for recognizing a parking space for a vehicle, including the steps of: capturing successive image frames containing an obstacle while the vehicle is moving; identifying the obstacle from the successive image frames and generating a first boundary for the obstacle by a Convolutional Neural Network (CNN) algorithm based on a position of the obstacle shown in each of the successive image frames; detecting a plurality of distances between the moving vehicle and the obstacle; generating a second boundary for the obstacle based on the plurality of distances between the vehicle and the obstacle; defining a periphery of the obstacle by adjusting the second boundary with the first boundary; and recognizing a parking space with the aid of the periphery of the obstacle.

According to another aspect of the present invention, there is provided a parking assistance system for a vehicle, including: an image capture module for capturing successive image frames containing an obstacle when the vehicle is moving; an identification module for identifying the obstacle from the successive image frames and generating a first boundary for the obstacle by a Convolutional Neural Network (CNN) algorithm based on a position of the obstacle shown in each of the successive image frames; at least an ultrasonic sensor for detecting a plurality of distances between the moving vehicle and the obstacle; a distance modification module for generating a second boundary for the obstacle based on the plurality of distances between the vehicle and obstacle; a periphery definition module for defining a periphery of the obstacle by adjusting the second boundary with the first boundary; and a parking space recognition module for recognizing a parking space with the aid of the periphery of the obstacle.

This paragraph extracts and compiles some features of the present invention; other features will be disclosed in the follow-up paragraphs. It is intended to cover various modifications and similar arrangements included within the spirit and scope of the appended claims.

BRIEF DESCRIPTION OF THE DRAWINGS

The above and other objects, features and advantages of the present invention will be more apparent from the following detailed description taken in conjunction with the accompanying drawings, in which:

FIG. 7 is a schematic view showing unprocessed obstacle edge points obtained according to the preferred embodiment of the present invention;

DETAILED DESCRIPTION OF THE PREFERRED EMBODIMENTS

The present invention will now be described more specifically with reference to the following embodiments.

Figure 1:
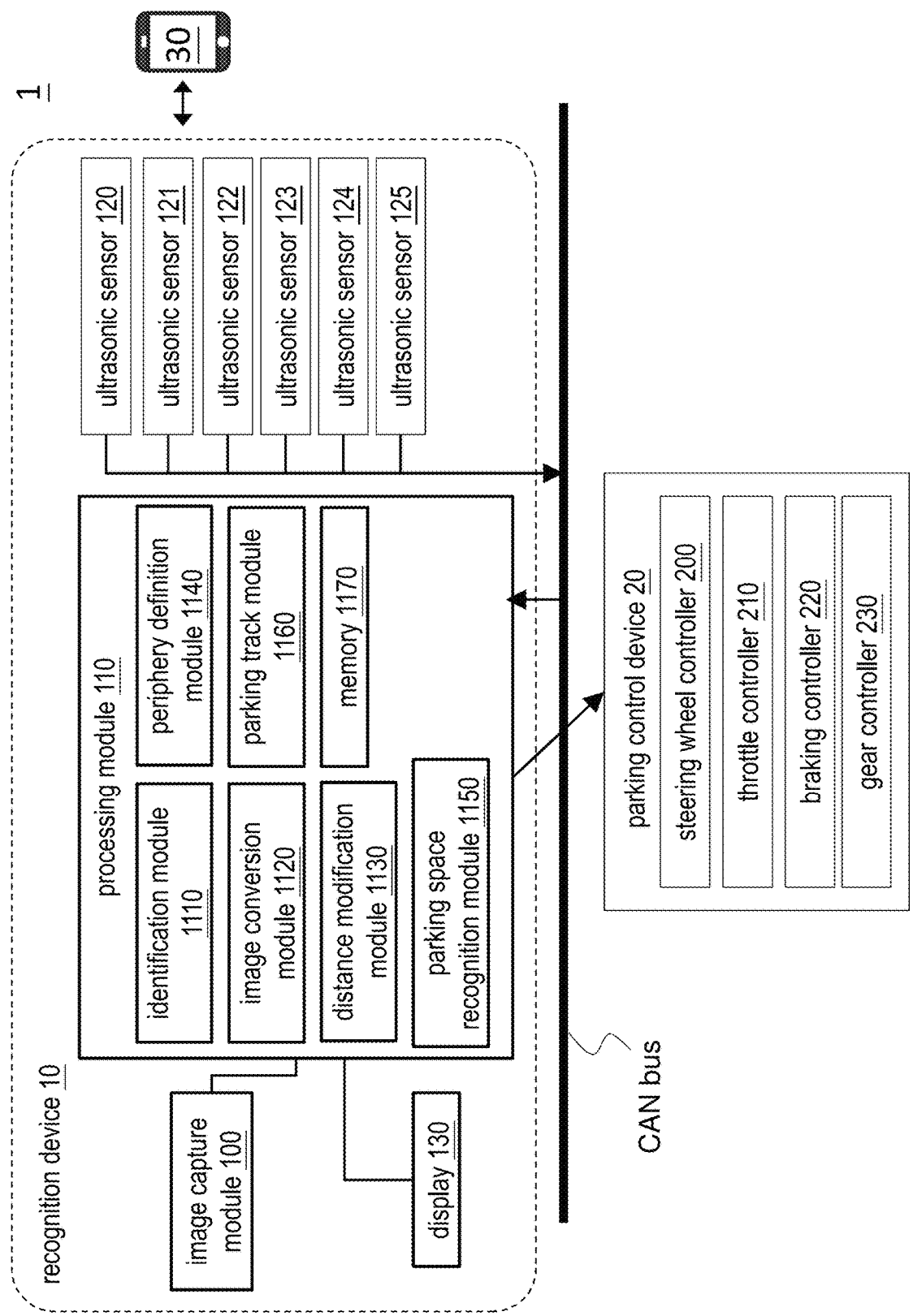
FIG. 1 is a block diagram showing a parking assistance system for a vehicle according to a preferred embodiment of the present invention.

Referring to FIG. 1, a preferred embodiment of a parking assistance system 1 for a subject vehicle SV (not shown in FIG. 1) according to the present invention is disclosed. The parking assistance system 1 has a recognition device 10, a parking control device 20, and a Controller Area Network (CAN) bus communicated between the recognition device 10 and the parking control device 20. The recognition device 10 includes an image capture module 100, a processing module 110, ultrasonic sensors 120-125, and a display 130. The processing module 110 is programmed to receive detection signals from the parking control device 20 via the CAN bus and transmit control signals to the parking control device 20 via the CAN bus. The parking control device 20 includes a steering wheel controller 200, a throttle controller 210, a braking controller 220 and a gear controller 230. Furthermore, a handheld device 30 such as a smart phone can be used to remotely control the parking assistance system 1 as shown.

The CAN bus is a vehicle bus standard designed to allow microprocessors and devices to communicate with each other in applications without a host computer and it is a message-based protocol for use in automobiles. One key advantage of the CAN bus is that interconnection between different vehicle systems can allow a wide range of safety, economy and convenience features to be implemented using software alone. Otherwise, it would add cost and complexity if such features were "hard wired" using traditional automotive electrics. As a matter of fact all electronic control units (ECUs) in a vehicle can be connected through the two-wired CAN bus.

Figure 2:
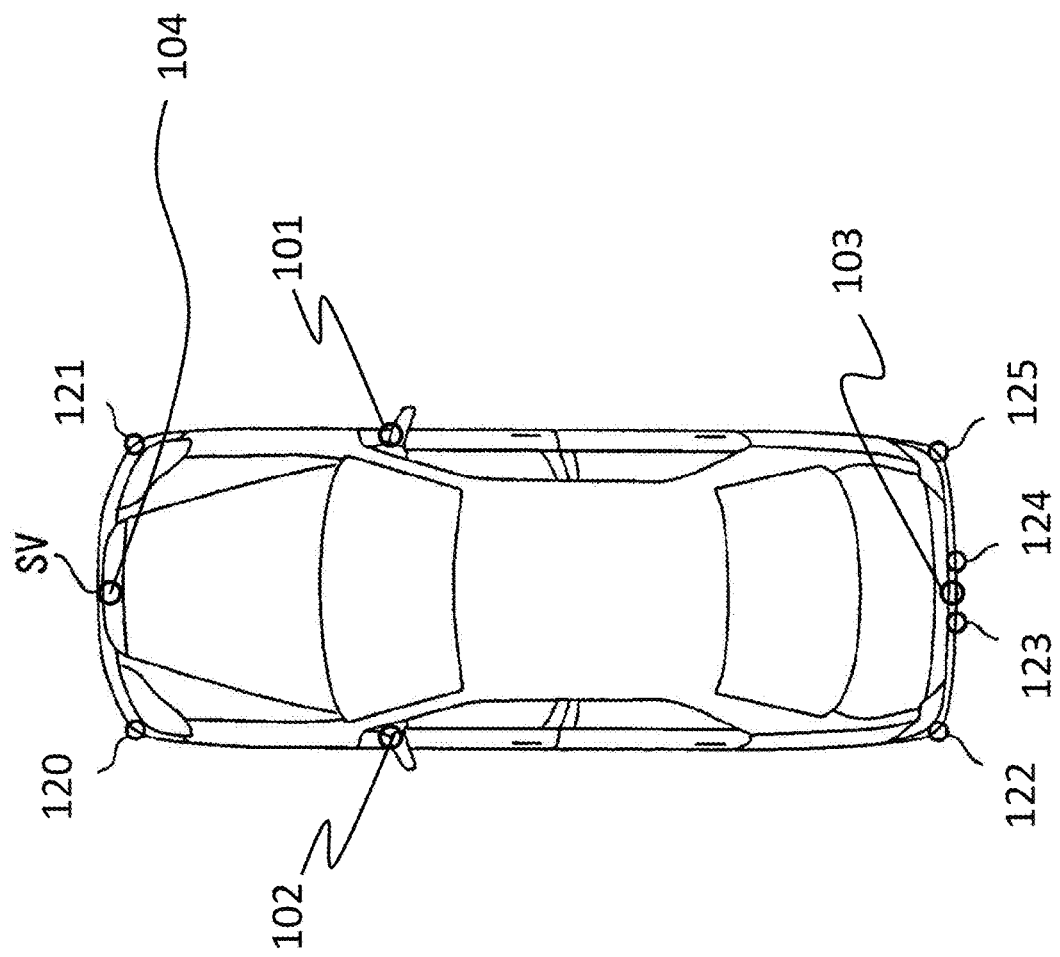
FIG. 2 is a schematic plan view showing four cameras and six ultrasonic sensors mounted on a vehicle according to the preferred embodiment of the present invention.
Figure 3:
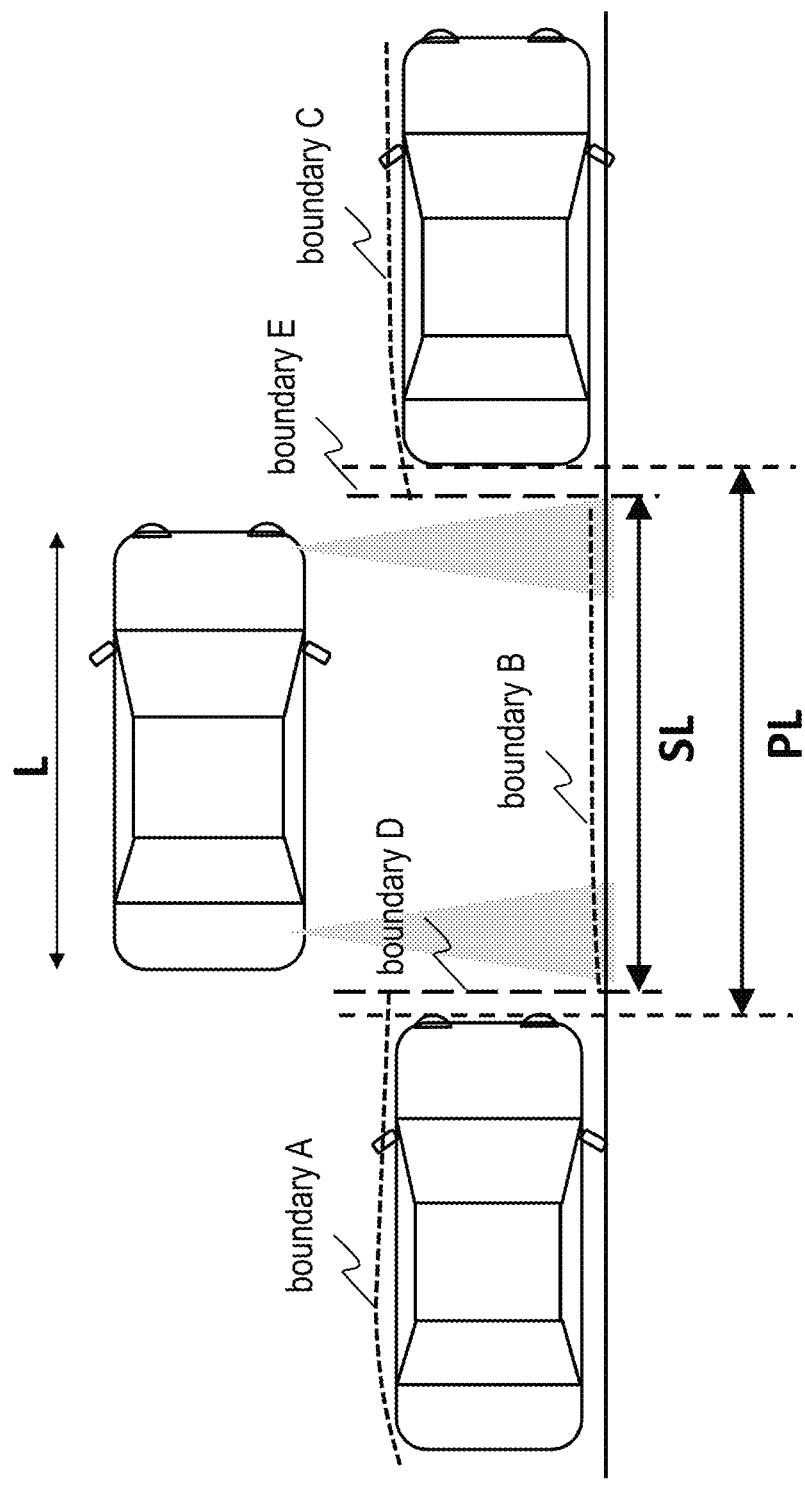
FIG. 3 is a schematic view showing difference in recognition of a parking space by ultrasonic sensors and cameras.

In the present embodiment, in order to obtain panoramic survey of the environment around the subject vehicle SV, the image capture module 100 includes four cameras 101-104 provided at the right rearview mirror, at the left rearview mirror, above the rear license plate and above the front license plate of the subject vehicle SV, respectively, as shown in FIG. 2. The ultrasonic sensors 120-125 are provided at the front left end, front right end, rear left end, rear central parts, and rear right end of the subject vehicle SV, respectively, as shown in FIG. 2. Although there are four cameras 101-104 included in the image capture module 100, it should be understood that the amount of cameras required is not limited to four. Similarly, the amount of ultrasonic sensors is not limited to six. Ultrasonic waves are irradiated from the ultrasonic sensors 120-125 to form a generally fan-shaped detection area to detect an obstacle OB within the detection area close to a parking space. However, the length (SL) of a parking space recognized merely by ultrasonic sensors are generally shorter than the real length (PL) of a parking space, as shown in FIG. 3, thereby causing a misjudgment of whether there's enough space for the subject vehicle SV to fit in the parking space. Specifically speaking, in order for the subject vehicle SV which has a length of L to fit in, the parking space needs to be larger than the length of the subject vehicle SV at least by 80 cm (i.e., PL≥L+80 cm). In order to accurately determine the length of a parking space, the present invention incorporated the use of the image capture module 100 to make up the insufficiency of ultrasonic sensors. Although ultrasonic sensors are able to precisely identify the distance between the obstacle OB and the subject vehicle SV and obtain boundaries A-C along the moving direction of the subject vehicle SV, ultrasonic sensors are not able to precisely identify boundaries D-E which are vertical to the moving direction of the subject vehicle SV. Furthermore, ultrasonic sensors have blind spots and are not able to identify the white line marks of the parking space, wheel stoppers, and lower objects on the ground (e.g., curbs), etc. However, such insufficiency or deficiency of ultrasonic sensors could also be made up by the use of the image capture module 100. Details will be described later.

The image capture module 100 sends the image picture frames captured by the cameras 101-104 to the processing module 110. On the other hand, the detection signals sent from the parking control device 20 to the processing module 110 through the CAN bus may include a speed detection signal indicative of the detected vehicle speed, a yaw rate detection signal indicative of the detected yaw rate, and a steering detection signal indicative of the detected rotating angle. Then, the processing module 110 determines a moving or turning condition of the vehicle SV based on these detection signals.

The processing module 110 includes an identification module 1100, an image conversion module 1120, a distance modification module 1130, a periphery definition module 1140, a parking space recognition module 1150, a parking track module 1160, and a memory 1170. The identification module 1110 in the processing module 110 identifies what the obstacle OB is, e.g., an adjacent vehicle, a lamppost, a wall, a curb, or even a parking space mark etc., and generates a first boundary B1 for the obstacle OB by a Semantic Segmentation Convolutional Neural Network (CNN) algorithm based on a position of the obstacle OB shown in each of the successive image picture frames. That is, the first boundary B1 for the obstacle OB is generated by Semantic Segmentation using the CNN, and then stored in the memory 1170, which stores any data to be accessed by the processing module 110.

Semantic segmentation is a natural step in the progression from coarse to fine inference:

The origin could be located at classification, which consists of making a prediction for a whole input.

The next step is localization/detection, which provide not only the classes but also additional information regarding the spatial location of those classes.

Finally, semantic segmentation achieves fine-grained inference by making dense predictions inferring labels for every pixel, so that each pixel is labeled with the class of its enclosing object core region.

Figure 4:
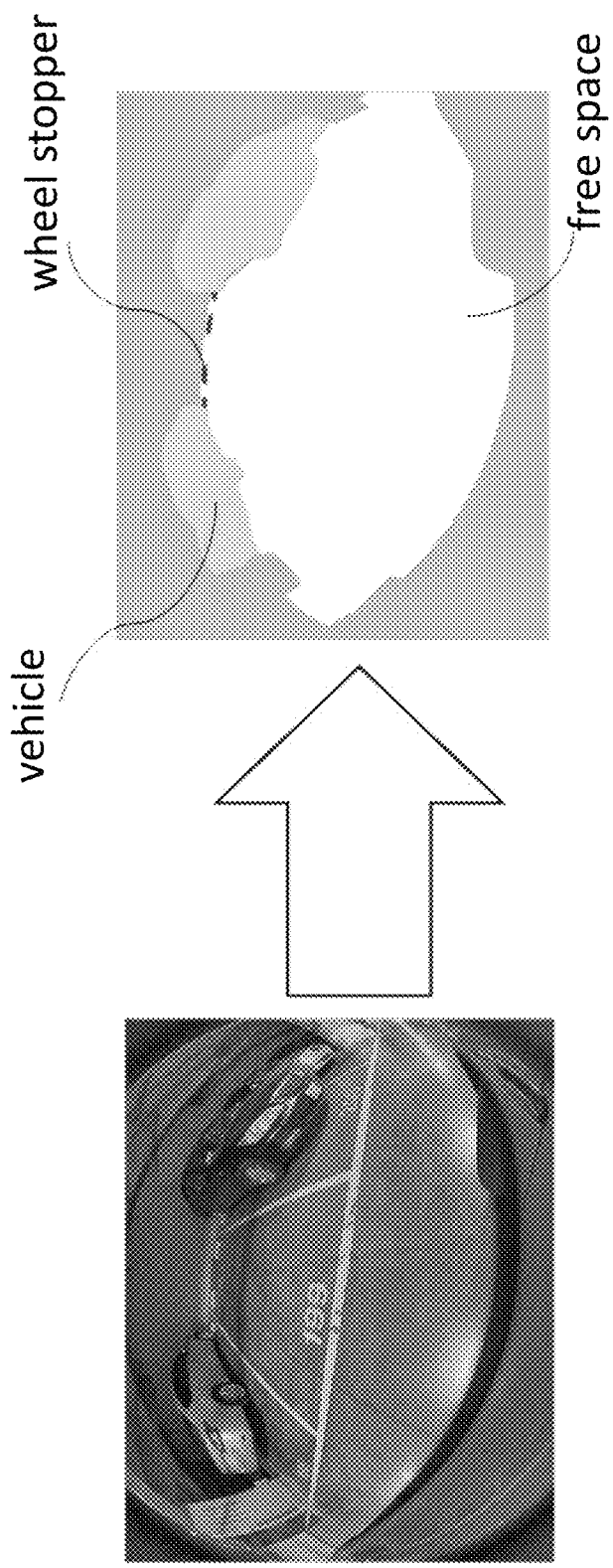
FIG. 4 shows a picture image and its semantic segmentation.

FIG. 4 shows a process of mapping each pixel in an image to an object class by the CNN. As shown, both vehicles in the image are labeled with the same color (i.e., cyan), and each object class has been segmented separately. Namely, in FIG. 4, the white region represents the ground (i.e., free space for parking), while the red dash line represents a wheel stopper.

The display 130 is provided in the vehicle SV to present various images to a driver under the control of the processing module 110. The images shown on the display 130 may include the subject vehicle SV itself, obstacles, adjacent vehicles, parking spaces, and environment, either in fisheye view or birds-eye view.

Figure 5:
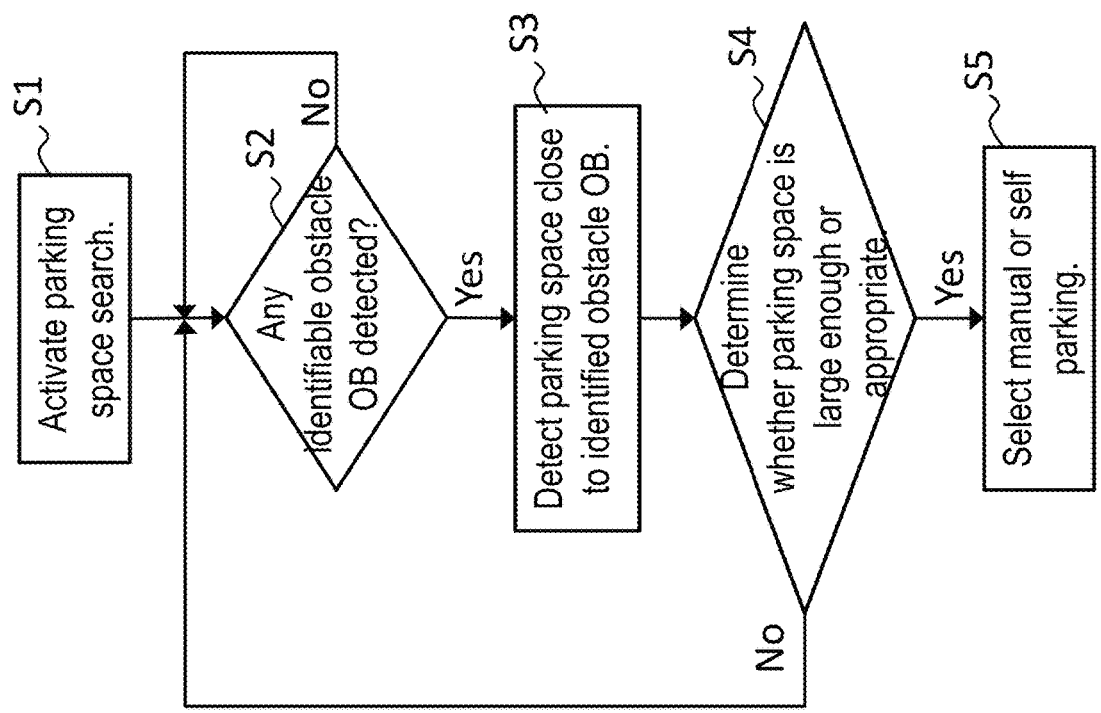
FIG. 5 is a flowchart showing parking assistance procedures executed in the preferred embodiment of the present invention.

FIG. 5 is a flowchart showing parking assistance procedures executed in the preferred embodiment of the present invention. At Step S1, parking space search is activated by the driver of the vehicle SV when the driver is looking for a parking space. Once the parking space search is activated, the identification module 1110 in the processing module 110 starts to detect whether there is an identifiable obstacle around the vehicle SV at Step S2. Step S2 would be repeated until an obstacle OB is identified, for example, as an adjacent vehicle, a lamppost, a wall, a curb, or even a parking space mark etc. In such a condition, the successive image frames taken by the image capture module 100 are converted into a birds-eye view image by the image conversion module 1120 in the processing module 110. Then, a first boundary B1 for the obstacle OB is generated by a Convolutional Neural Network (CNN) algorithm based on a position of the obstacle OB shown in each of the successive image frames.

Figure 6B:
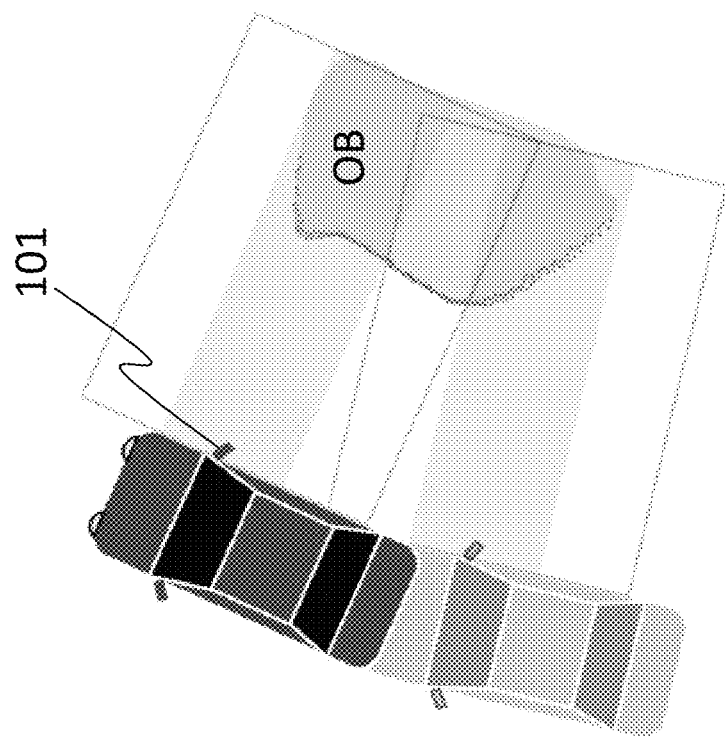
FIGS. 6a and 6b are schematic views showing scanning of an obstacle by a moving vehicle according to the preferred embodiment of the present invention.
Figure 6A:
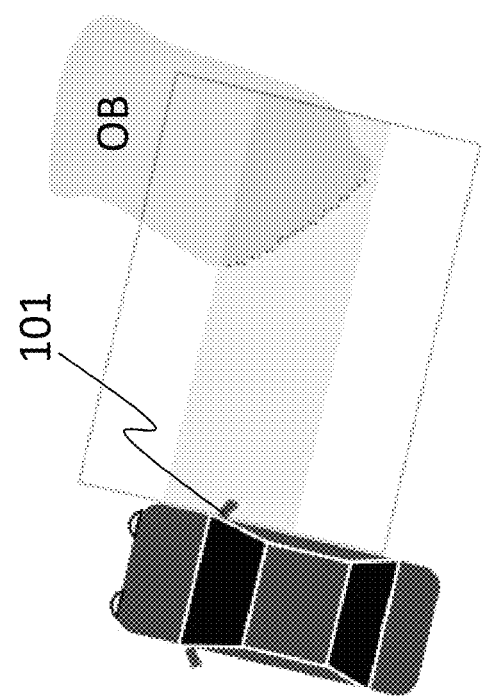

Hereinafter, procedures for generating the first boundary B1 are explained. First, referring to FIG. 6a, it is a schematic view showing scanning of the obstacle OB by the moving subject vehicle SV according to the preferred embodiment of the present invention. When the parking space search is activated by the driver of the vehicle SV (Step S1 in FIG. 5), the CNN is carried out for each pixel in the pictures taken by the image capture module 100 to determine whether there is an identifiable feature among the pixels. If positive, the obstacle OB containing the identifiable feature would be identified and all the pixels which are identified to form the obstacle OB would be labeled with the same color. In the case of FIG. 6a, the obstacle OB is identified as an adjacent vehicle and the pixels along the edges of the obstacle OB are shown in dots, i.e., obstacle edge points. Along with the forward travel of the vehicle SV, more pictures taken by the image capture module 100 (mainly by the camera 101) are analyzed and thus more obstacle edge points are generated as shown in FIG. 6b.

FIG. 7 shows the resultant obstacle OB having accumulated obstacle edge points. Since the cameras 101-104 in the image capture modules 110 use fisheye lens and the successive picture frames are taken when the cameras 101-104 are moving along with the subject vehicles SV, significant distortions of the obstacle OB are inevitable. Therefore, merging and denoising processes are needed as described below.

Firstly, each obstacle edge point from each picture frame will be moved and/or merged frame-by-frame on the basis of next obstacle edge point from next picture frame. In FIG. 8a, a base score is given to a new obstacle edge point based on a distance between the new point and the camera 101 as below:

$$s(p) = \frac{y}{k_1} \quad \text{(Eq. 1)}$$

where "s" represents a base score, "y" represents a length in the direction opposing to the camera 101 (vertical direction as shown), "$k_1$" can be any natural number and "100" is used in this case.

Figure 8B:
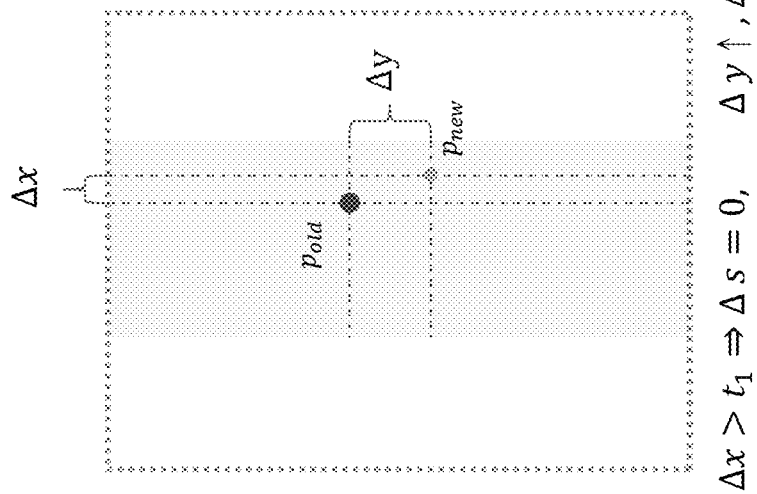
FIGS. 8a~8d are schematic views showing merging and denoising of the obstacle edge points by multi-frame information according to the preferred embodiment of the present invention.
Figure 8A:
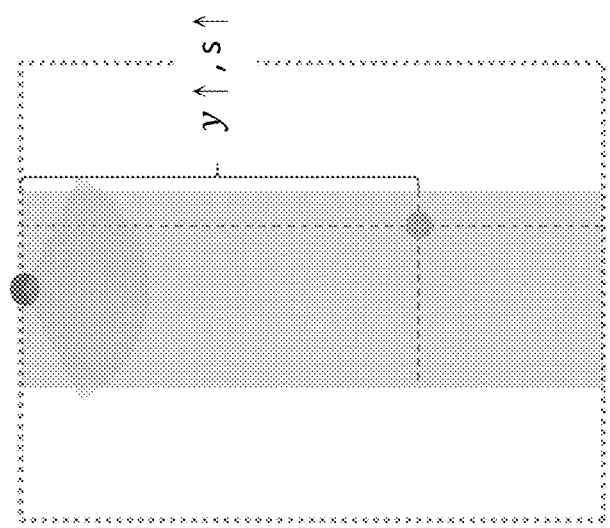

In FIG. 8b, a base score of an old point is adjusted by adding an adjusting score which is equivalent to the base score of the new point multiplied by a distance factor if a first distance between the new point and an adjacent old point in the horizontal direction as shown is smaller than a first threshold value ($t_1$=50 in this case) as below:

$$s'_{old} = s_{old} + \Delta s \quad \text{(Eq. 2a)}$$

$$\Delta s = s(p_{new}) \times g(|y_{new} - y_{old}|) \quad \text{(Eq. 2b)}$$

$$g(x) = \max\left(-1, 1 - \frac{x}{70}\right) \quad \text{(Eq. 2c)}$$

where "$\Delta s$" represents the adjusting score, "$\Delta x$" represents the first distance, and "g" represents a distance factor.

Figure 8D:
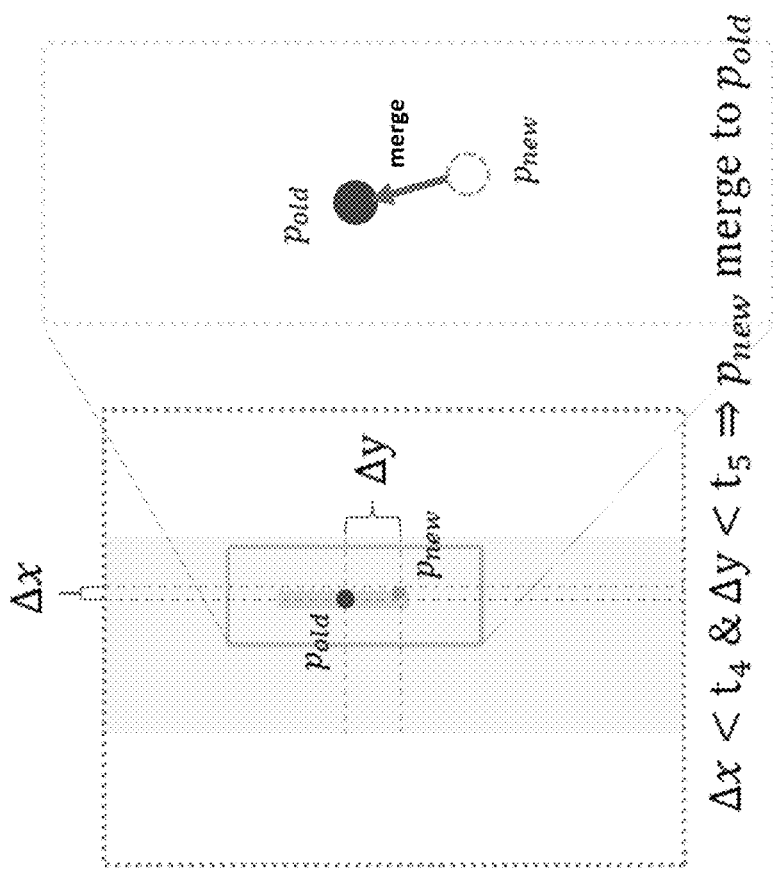
Figure 8C:
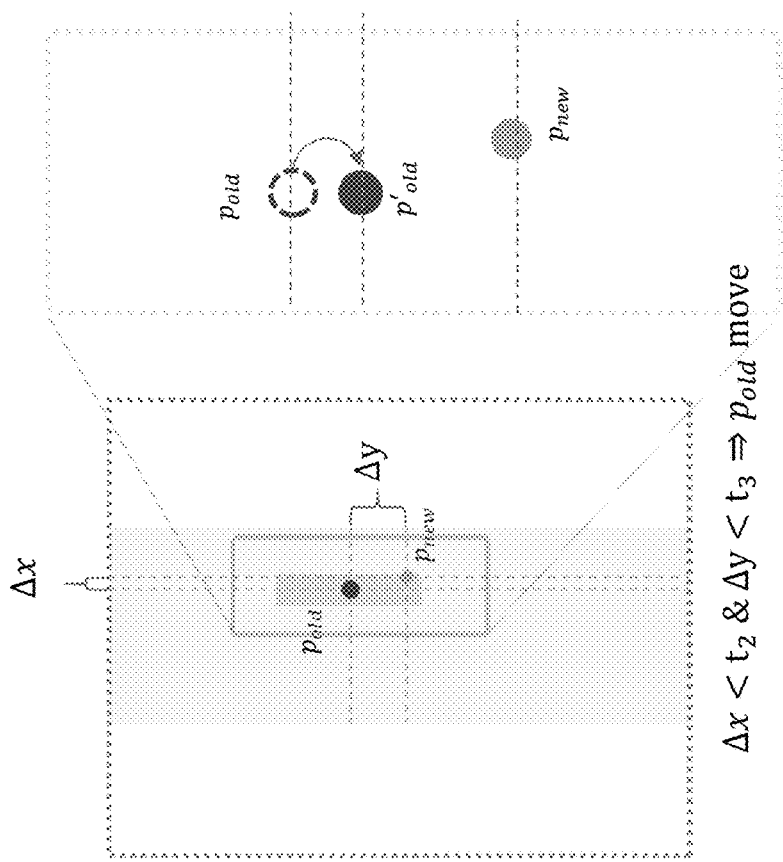

In FIG. 8c, the adjacent old point is moved vertically if the first distance in the horizontal direction is smaller than a second threshold value ($t_2$=40 in this case) and a second distance between the new point and the adjacent old point in the vertical direction is smaller than a third threshold value ($t_3$=60 in this case) as below:

$$y'_{old} = \left(1 - \frac{\Delta s}{s'_{old}}\right) * y_{old} + \frac{\Delta s}{s'_{old}} * y_{new} \quad \text{(Eq. 3)}$$

Referring to FIG. 8d, the new point is merged to the adjacent old point if the first distance is smaller than a fourth threshold value ($t_4$=20 in this case) and the second distance ($t_5$=40 in this case) is smaller than a fifth threshold value.

Figure 9:
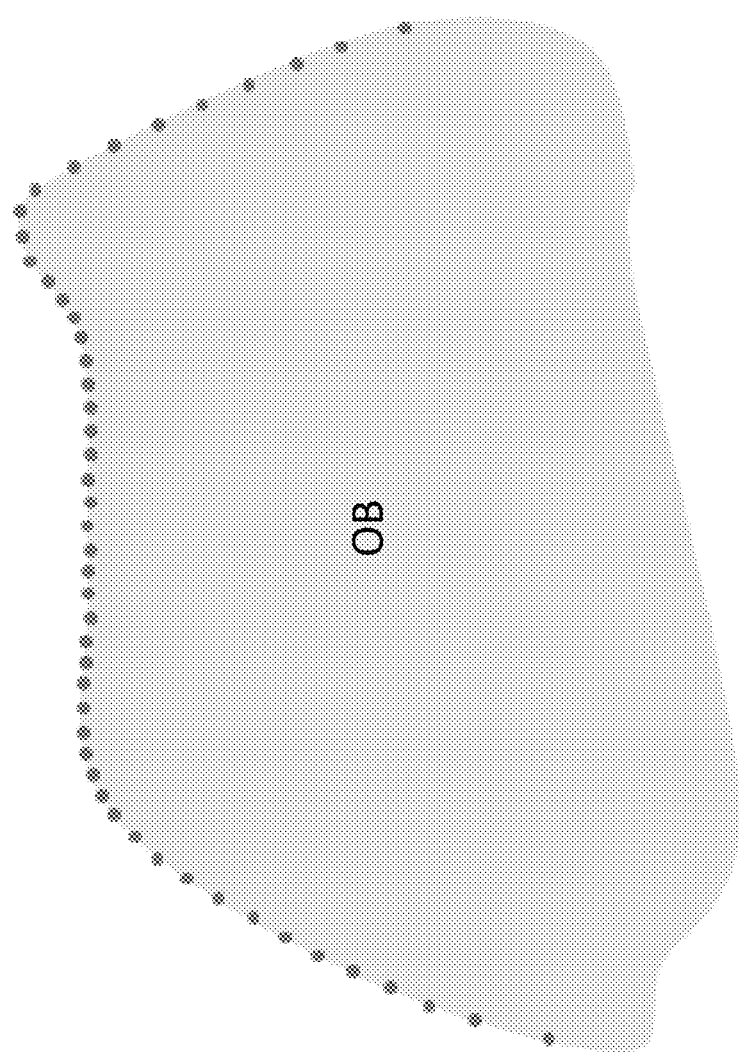
FIG. 9 is a schematic view showing the processed obstacle edge points with merging and denoising by multi-frame information according to the preferred embodiment of the present invention, in comparison with FIG. 7.

After merging and denoising for the obstacle edge points in FIG. 7 with reference to FIG. 8 is performed as above, a much more precise boundary B1 is formed as shown in FIG. 9.

Meanwhile, the ultrasonic sensors 120-125 detect distances between the vehicle SV and the obstacle OB, and the distance modification module 1130 in the processing module 110 generates a second boundary B2 for the obstacle OB based on the distances between the vehicle SV and the obstacle OB. Then, the periphery definition module 1140 in the processing module 110 fuses the first boundary B1 and the second boundary B2 to form a smooth periphery for the obstacle OB.

Figure 10:
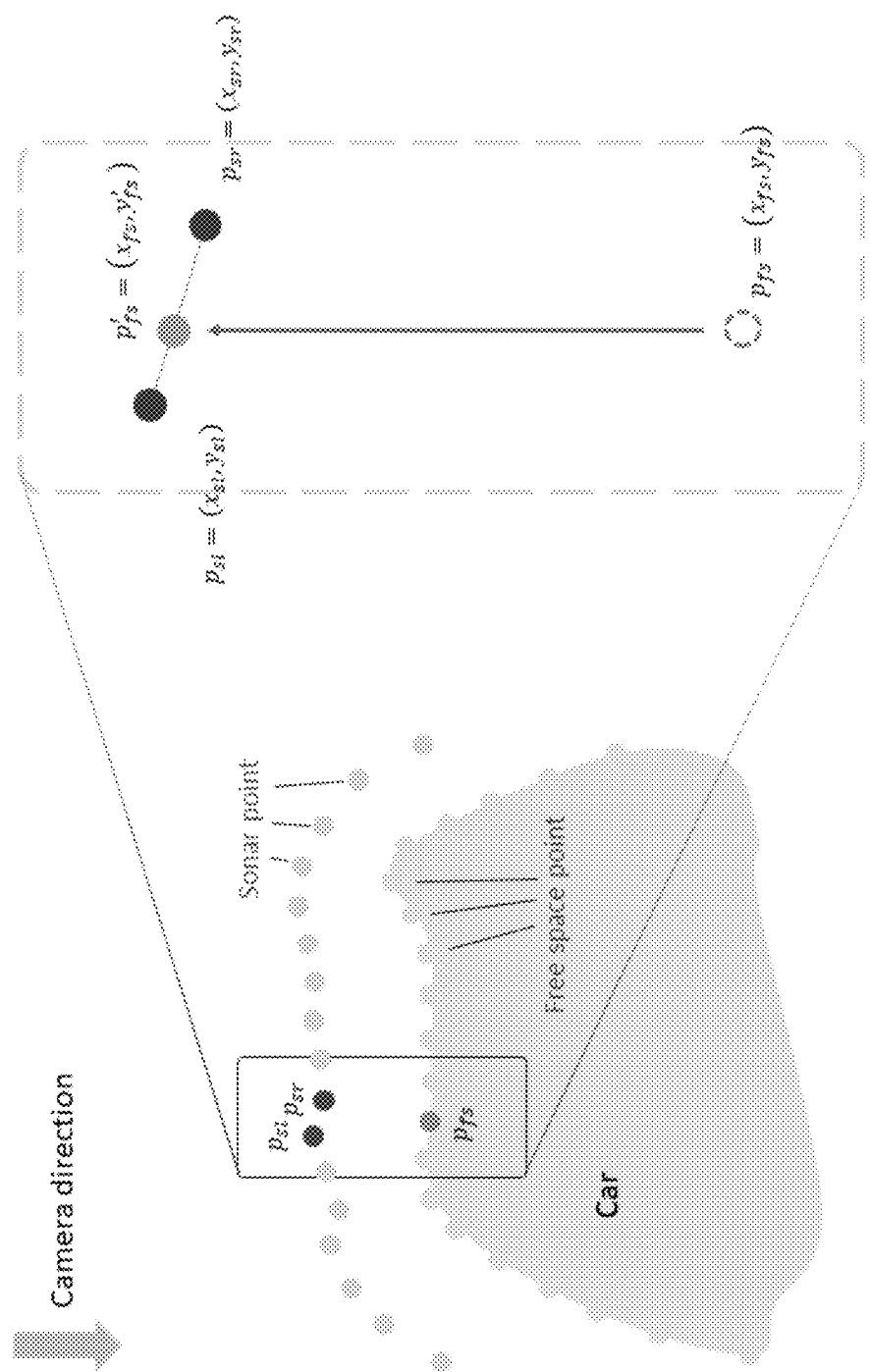
FIG. 10 is a view illustrating refinement of a distance between the moving vehicle and the obstacle by fusion according to the preferred embodiment of the present invention.

As shown in FIG. 10, it illustrates refinement of a distance between the moving vehicle and the obstacle by fusion according to the preferred embodiment of the present invention. That is, the first boundary B1 for the obstacle OB and the second boundary B2 are fused as explained below.

In FIG. 10, any two adjacent obstacle edge points $P_{sl}$ with coordinates of $(x_{sl}, y_{sl})$ and $P_{sr}$ with coordinates of $(x_{sr}, y_{sr})$ in the second boundary B2 are utilized. An obstacle edge point $P_{fs}$ with coordinates of $(x_{fs}, y_{fs})$ in the first boundary B1 having a horizontal position ranging between $P_{sl}$ and $P_{sr}$ is refined according to Equation 4 as below:

$$y'_{fs} = \left(1 - \frac{x_{fs} - x_{sl}}{x_{sr} - x_{sl}}\right) \times y_{sl} + \left(\frac{x_{fs} - x_{sl}}{x_{sr} - x_{sl}}\right) \times y_{sr} \quad \text{(Eq. 4)}$$

Figure 11C:
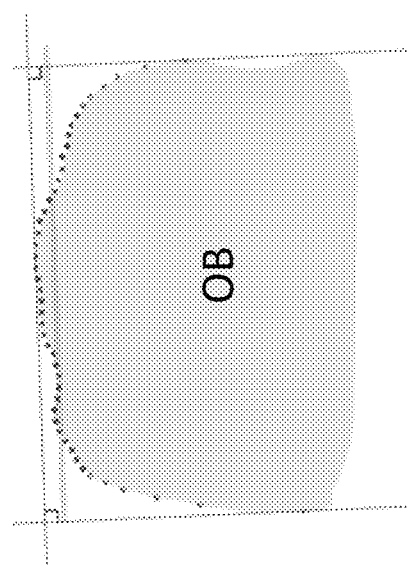
FIGS. 11a~11c are views showing definition of a periphery of the obstacle by an iterated linear regression according to the preferred embodiment of the present invention.
Figure 11B:
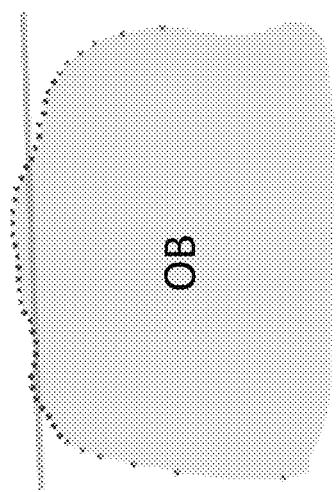
Figure 11A:
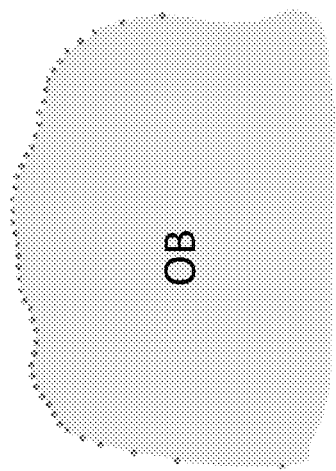

The refined result is shown in FIG. 11a. However, the refined boundary is not sufficient to recognize whether a free space close to the obstacle OB is large enough for parking. Specifically, a periphery of the obstacle OB is needed for this purpose. According to the preferred embodiment, the obstacle OB is identified as an adjacent vehicle, and the periphery would be generally rectangular in the top view.

In light of the above, an iterated linear regression directed to the refined obstacle edge points is firstly performed. The linear regression is repeated several times each without the most distant points from the regression line. The result is shown in FIG. 11b. For parallel parking such as that shown in FIG. 3, the resultant regression line in FIG. 11b is deemed to represent a side of an adjacent vehicle. Next, two lines perpendicular to the resultant regression line are formed to accommodate all the obstacle edge points between them. Thereafter, the regression line is moved parallelly toward the subject vehicle SV to accommodate all the obstacle edge points. Therefore, a precise periphery for the obstacle OB can be easily obtained as shown in FIG. 11c.

Returning back to FIG. 5, at step S4, the parking space recognition module 1150 in the processing module 110 determines whether a potential parking space is large enough with reference to the periphery of the obstacle OB or whether it is appropriate for parking. For instance, the potential parking space is for the handicapped only, or the free space is between two parking spaces but there is a fire hydrant beyond the curb. In particular, the identification module 1110 according to the present invention identifies not only identifiable features of the obstacles nearby the parking space, but also identifiable features in the parking space, in order to determine whether a large parking space is appropriate for parking or not. The identifiable features in the parking space include parking space marks, colors of the parking space marks, handicapped or any other similar marks, NO PARKING signs, and so on.

If NO at Step S4, the flow returns to step S2 to repeat the above processes to look for another potential parking space. Otherwise, the flow goes to Step S5. At step S5, the driver can select either manual parking or self parking if the driver is not skilled in parking or the parking space is just large enough to accommodate the subject vehicle SV but not large enough for the driver to open the driver side door.

For manual parking, the parking track module 1160 in the processing module 110 generates a parking track for the subject vehicle SV and sends it to the display 130 for the driver. The parking track includes an outline of the parking space and a path from a current position of the vehicle SV to the parking space, and it is stored in the memory 1170 together with the panoramic environment around the subject vehicle SV, so that the driver can park the subject vehicle SV along the parking path to the parking space.

Similarly, for the self parking case, the parking track module 1160 generates a parking track for the subject vehicle SV and sends it to the display 130 for the driver too. In contrast with the manual parking mentioned above, however, at this stage, the driver can activate the self parking via the display 130 or can optionally activate the self parking via the handheld device 30 in the subject vehicle SV or outside of the subject vehicle SV. Either the display 130 or handheld device 30 can control the parking control device 20 through the processing module 110 via the Controller Area Network (CAN) bus.

Figure 12:
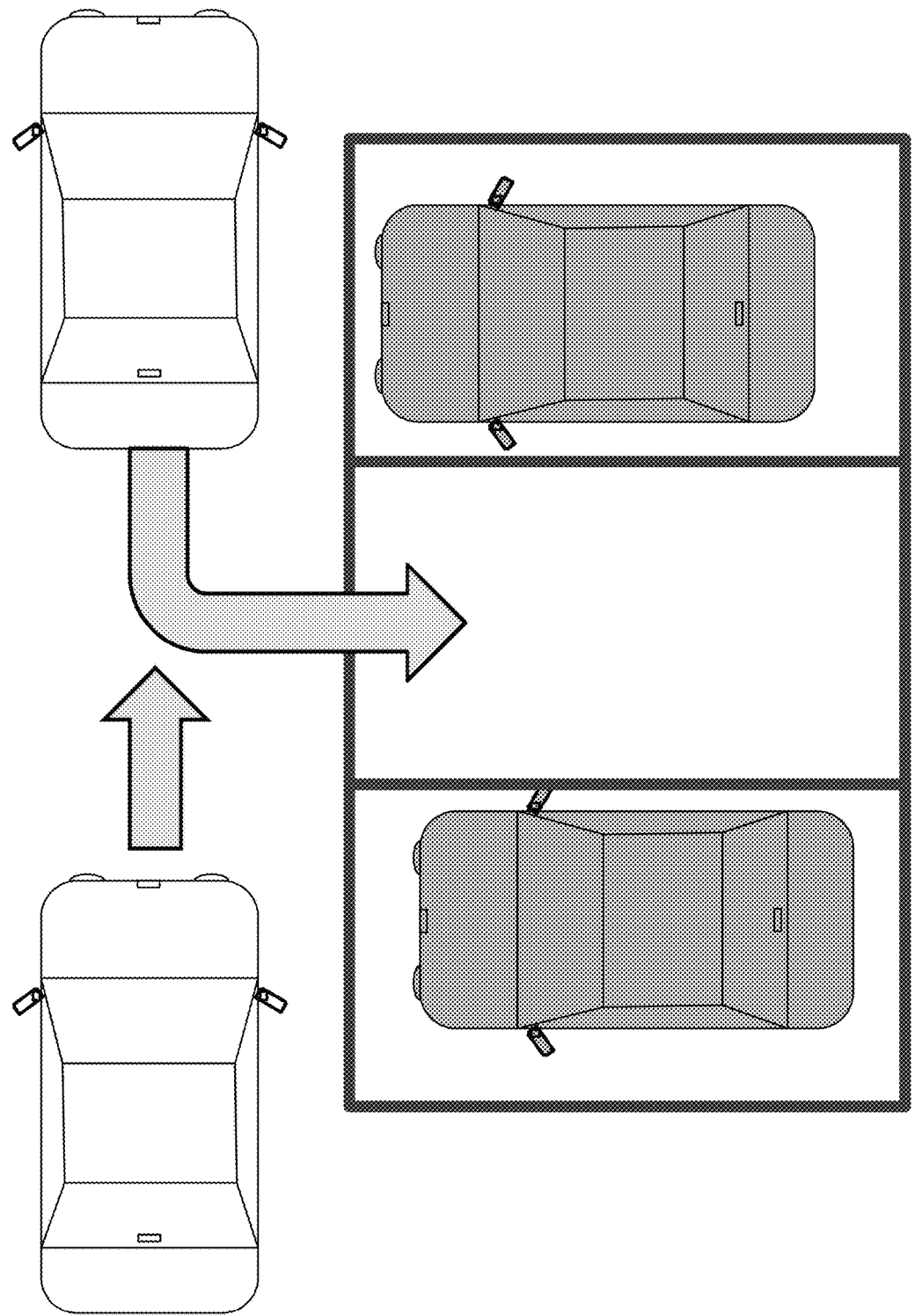
FIG. 12 is a schematic view showing vehicle parking after a parking space is recognized according to the preferred embodiment of the present invention.

Referring to FIG. 12, it is a schematic view showing vehicle parking after a parking space is recognized according to the preferred embodiment of the present invention. The subject vehicle SV identifies two adjacent vehicles, parking space marks and a free space for parking between the adjacent vehicles.

Figure 13:
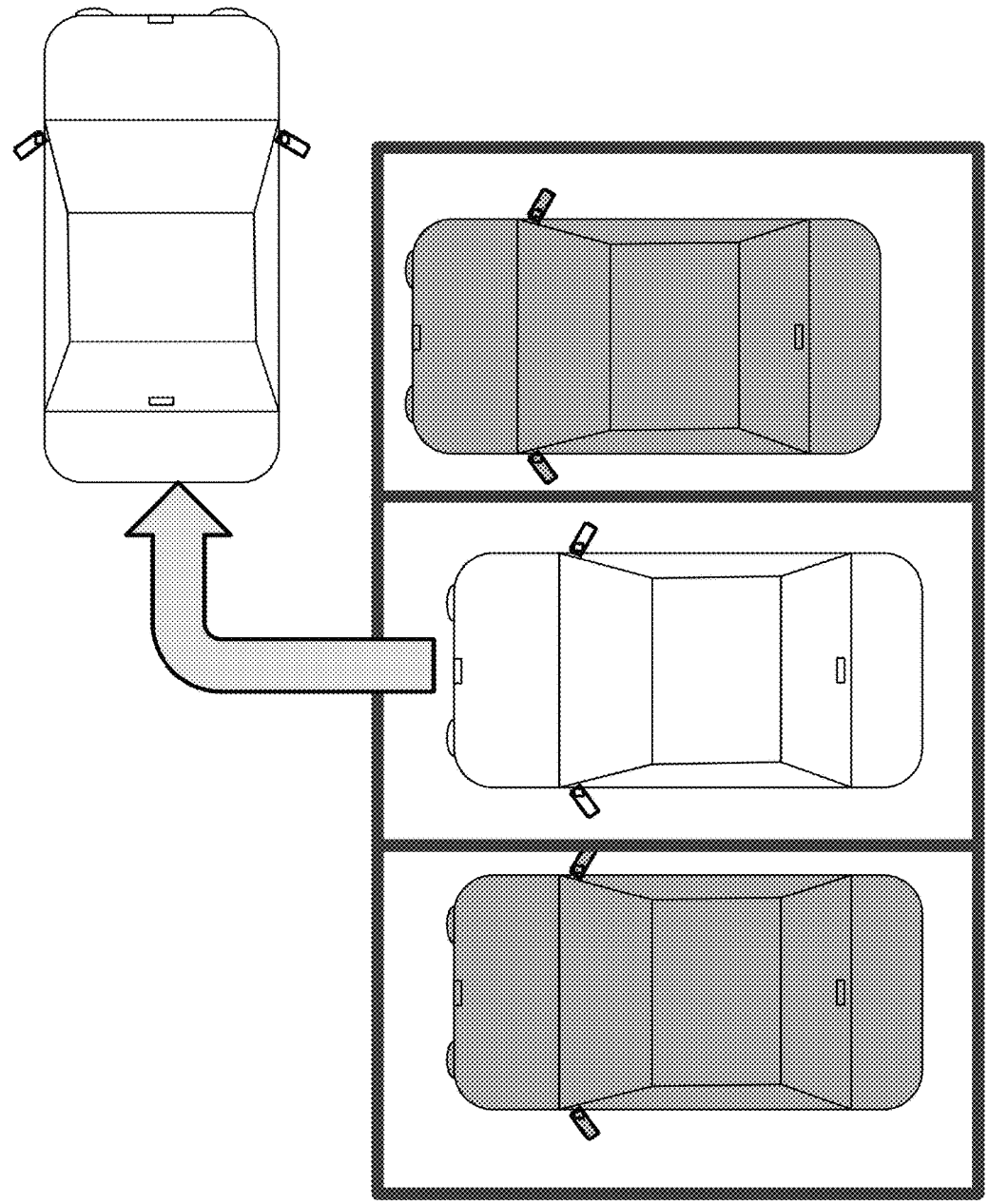
FIG. 13 is a schematic view showing the vehicle travelling from the parking space to a predetermined location according to the preferred embodiment of the present invention.
Figure 14:
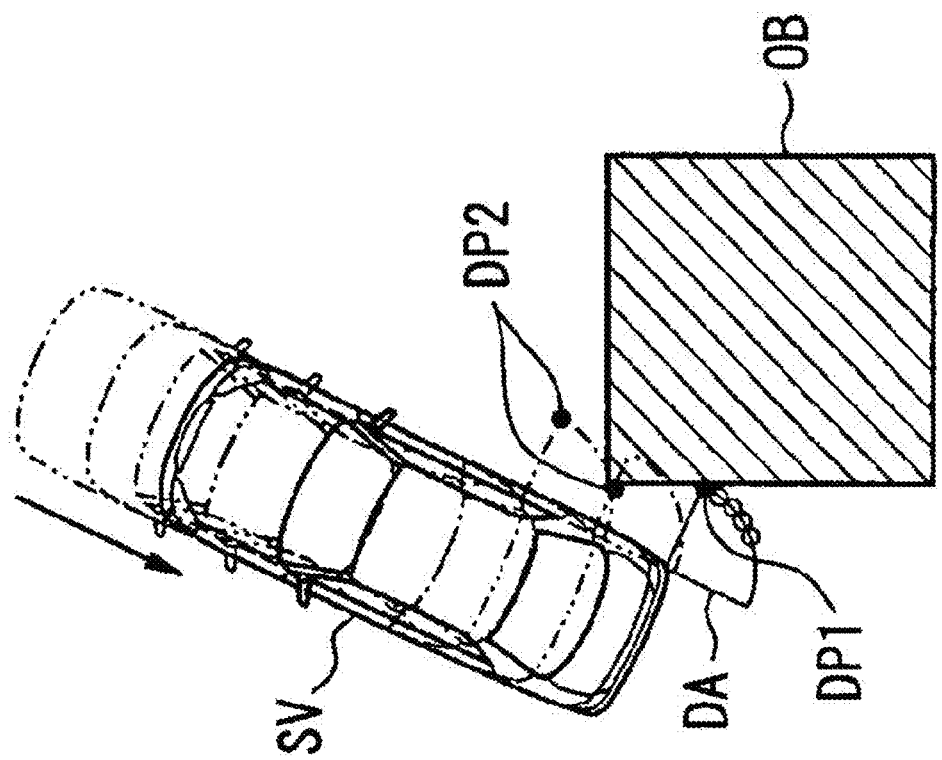
FIG. 14 is a schematic diagram illustrating a vehicle parking assisting system in which both of a sonic sensor and a camera are used in an overlapping manner according to a prior art.
Figure 15:
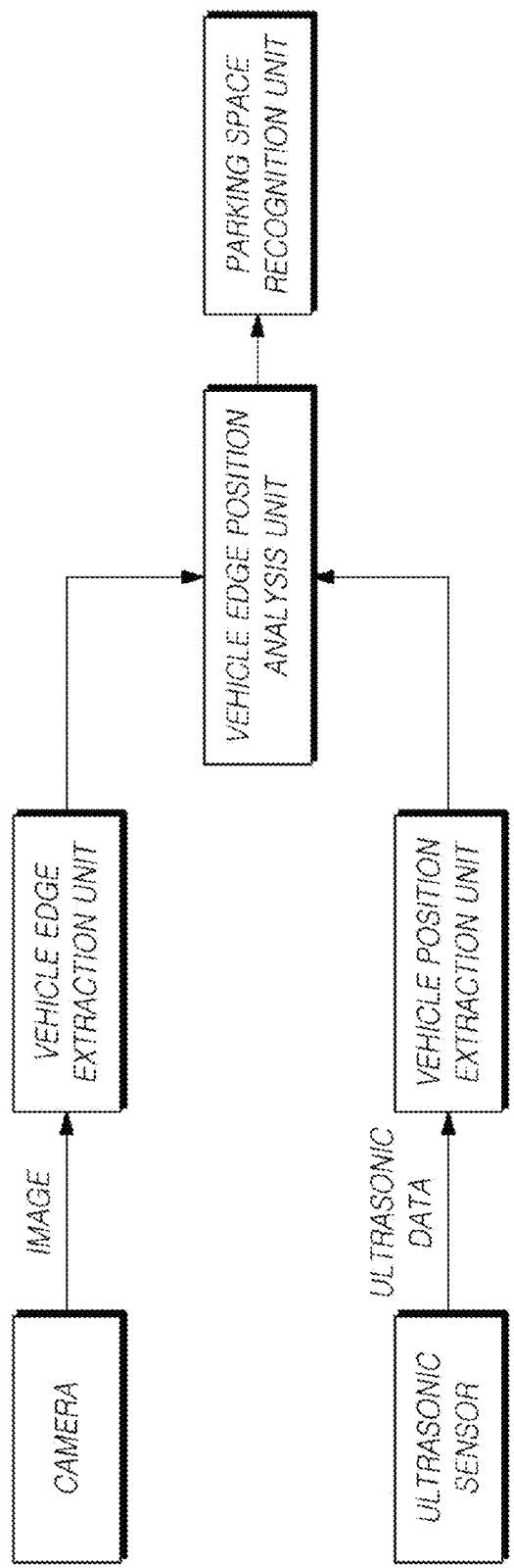
FIG. 15 is a block diagram showing a parking space recognition technology according to another prior art.

On the other hand, when the driver is heading for another place, he can utilize the parking track and the panoramic environment around the subject vehicle SV stored in the memory 1170 to activate the parking control device 20 again and self-drive the subject vehicle SV to a designated location along the stored parking track via the display 130 or the handheld device 30, as shown in FIG. 13.

The above embodiment may be modified in various ways. For instance, a sound output module can be incorporated into the vehicle SV to generate various sound messages or warnings for the driver to invite the driver's caution, for example, when the vehicle SV is within a predetermined distance from the obstacle OB. Furthermore, the numbers and the arrangements of the cameras and the ultrasonic sensors may be changed, depending on the needs.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for recognizing a parking space for a vehicle, comprising the steps of:
   capturing successive image frames containing an obstacle while the vehicle is moving;
   converting the successive image frames containing the obstacle into a birds-eye view image;
   identifying the obstacle from the birds-eye view image and generating obstacle edge points of the obstacle by a Convolutional Neural Network (CNN) algorithm based on a position of the obstacle shown in each of the successive image frames;
   generating a first boundary for the obstacle by merging and denoising the obstacle edge points generated by the CNN algorithm;
   detecting a plurality of distances between the moving vehicle and the obstacle by at least an ultrasonic sensor;
   generating a second boundary for the obstacle based on the plurality of distances between the moving vehicle and the obstacle detected by the ultrasonic sensor(s);

defining a periphery of the obstacle by refining y-coordinate of each point of the first boundary $P_{fs}$ ($x_{fs}$, $y_{fs}$) based on the coordinates $P_{sl}$ ($x_{sl}$, $y_{sl}$) and $P_{sr}$ ($x_{sr}$, $y_{sr}$) of two adjacent corresponding points $P_{sl}$ and $P_{sr}$ of the second boundary according to the following equation:

$$y'_{fs} = \left(1 - \frac{x_{fs} - x_{sl}}{x_{sr} - x_{sl}}\right) \times y_{sl} + \left(\frac{x_{fs} - x_{sl}}{x_{sr} - x_{sl}}\right) \times y_{sr};$$

and
recognizing a parking space with the aid of the periphery of the obstacle.

2. A method for recognizing a parking space for a vehicle according to claim 1, wherein the obstacle is an adjacent vehicle.

3. A method for recognizing a parking space for a vehicle according to claim 1, further comprising a step of:
generating a parking track for the vehicle.

4. A method for recognizing a parking space for a vehicle according to claim 3, further comprising a step of:
steering the vehicle to the parking space with reference to the parking track.

5. A method for recognizing a parking space for a vehicle according to claim 1, wherein the parking space comprises an identifiable feature.

6. A method for recognizing a parking space for a vehicle according to claim 3, wherein the parking track comprises an outline of the parking space and a path from a current position of the vehicle to the parking space.

7. A method for recognizing a parking space for a vehicle according to claim 4, further comprising a step of:
steering the vehicle from the parking space to a designated location along the parking track.

8. A method for recognizing a parking space for a vehicle according to claim 2, further comprising a step of:
displaying a top view of the moving vehicle and/or a top view of the adjacent vehicle.

9. A parking assistance system for a vehicle, comprising:
an image capture module for capturing successive image frames containing an obstacle when the vehicle is moving;
an image conversion module for converting each of the successive image frames containing the obstacle into a birds-eye view image;
an identification module for identifying the obstacle from the birds-eye view image and generating obstacle edge points of the obstacle by a Convolutional Neural Network (CNN) algorithm based on a position of the obstacle shown in each of the successive image frames and generating a first boundary for the obstacle by merging and denoising the obstacle edge points generated by the CNN algorithm;
at least an ultrasonic sensor for detecting a plurality of distances between the moving vehicle and the obstacle;
a distance modification module for generating a second boundary for the obstacle based on the plurality of distances between the moving vehicle and obstacle detected by the ultrasonic sensor(s);
a periphery definition module for defining a periphery of the obstacle by refining y-coordinate of each point of the first boundary $P_{fs}$ ($x_{fs}$, $y_{fs}$) based on the coordinates $P_{sl}$ ($x_{sl}$, $y_{sl}$) and $P_{sr}$ ($x_{sr}$, $y_{sr}$) of two adjacent corresponding points $P_{sl}$ and $P_{sr}$ of the second boundary according to the following equation:

$$y'_{fs} = \left(1 - \frac{x_{fs} - x_{sl}}{x_{sr} - x_{sl}}\right) \times y_{sl} + \left(\frac{x_{fs} - x_{sl}}{x_{sr} - x_{sl}}\right) \times y_{sr};$$

and
a parking space recognition module for recognizing a parking space with the aid of the periphery of the obstacle.

10. A parking assistance system according to claim 9, wherein the obstacle is an adjacent vehicle.

11. A parking assistance system according to claim 9, further comprising a parking track module for generating a parking track for the vehicle.

12. A parking assistance system according to claim 11, further comprising a parking control device for steering the vehicle to the parking space with reference to the parking track.

13. A parking assistance system according to claim 9, wherein the parking space comprises an identifiable feature.

14. A parking assistance system according to claim 11, wherein the parking track comprises an outline of the parking space and a path from a current position of the vehicle to the parking space.

15. A parking assistance system according to claim 12, wherein the parking control device is used for steering the vehicle from the parking space to a designated location along the parking track.

16. A parking assistance system according to claim 10, further comprising a display for displaying a top view of the moving vehicle and/or a top view of the adjacent vehicle.

* * * * *